(12) United States Patent
Bosik et al.

(10) Patent No.: US 8,204,203 A0
(45) Date of Patent: Jun. 19, 2012

(54) METHOD OF MANAGING CIRCUIT SWITCHED AND INTERNET PROTOCOL TELEPHONE LINES ASSOCIATED WITH A DIGITAL SUBSCRIBER LINE SERVICE

(75) Inventors: Barry S. Bosik, Marlboro, NJ (US); Amit Garg, Freehold, NJ (US); Lawrence David Jackel, Holmdel, NJ (US); Rajeev B. Patil, Holmdel, NJ (US); Patrick Joseph Smith, Butler, NJ (US); Thomas M. Smith, Westfield, NJ (US); Jeffrey L. Tuttle, Hazlet, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 437 days.

(21) Appl. No.: 10/323,033

(22) Filed: Dec. 18, 2002

(51) Int. Cl.
G06F 15/16 (2006.01)
(52) U.S. Cl. .................................. 379/219; 379/201.01
(58) Field of Classification Search .................. 379/219, 379/90.01, 93.01, 142.01–142.18, 201.01, 379/201.02, 201.12, 203.02, 210.02, 211.02, 379/212.01, 220.01, 221.08, 229, 230
See application file for complete search history.

(56) References Cited

U.S. PATENT DOCUMENTS

| 6,091,808 | A * | 7/2000 | Wood et al. | 379/201.01 |
| 6,285,671 | B1 * | 9/2001 | Bossemeyer et al. | 370/352 |
| 6,718,021 | B2 * | 4/2004 | Crockett et al. | 379/93.23 |

OTHER PUBLICATIONS

U.S. Appl. No. 2005/0027887 (Zimler et al.), Feb. 2005.*
U.S. Appl. No. 2004/0114730 (Koch et al.), Jun. 2004.*
U.S. Appl. No. 2004/0066929 (Bremer et al.), Apr. 2004.*
U.S. Appl. No. 2003/0235182 (McMullin), Dec. 2003.*
U.S. Appl. No. 2003/0217110 (Weiss), Nov. 2003.*
U.S. Appl. No. 2003/0133407 (Segv et al.), Jul. 2003.*
U.S. Appl. No. 2003/0007621 (Graves et al.), Jan. 2003.*
U.S. Appl. No. 2002/0196741 (Jaramillo et al.), Dec. 2002.*
U.S. Appl. No. 2002/0176404 (Girard), Nov. 2002.*
U.S. Appl. No. 2001/0034758 (Kikinis), Oct. 2001.*
U.S. Appl. No. 2004/0017908 (Pelletier et al.), Jan. 2004).*

* cited by examiner

*Primary Examiner* — William J. Deane, Jr.

(57) ABSTRACT

A method of managing communications received by a Digital Subscriber Line (DSL) terminating at a residence associated with a subscriber is disclosed. The DSL is divided into one baseband line, one or more derived lines and a data connection. A query is received from a Service Control Point (SCP) for subscriber preferences for handling an incoming communication. The query is translated into an Internet Protocol (IP) message and communicated to a web server. A Common Gateway Interface (CGI) application module is invoked that corresponds to the particular type of communication being sent to the residence. The subscriber's preferences for handling the particular type of communication are retrieved from a database. Based on the retrieved preferences and invoked CGI application, call handling instructions are sent to the SCP.

1 Claim, 6 Drawing Sheets

METHOD OF MANAGING CIRCUIT SWITCHED AND INTERNET PROTOCOL TELEPHONE LINES ASSOCIATED WITH A DIGITAL SUBSCRIBER LINE SERVICE

FIELD OF THE INVENTION

The present invention is directed to a method of using an Internet-based system to manage multiple circuit switched and/or Internet Protocol (IP) telephone lines associated with a Digital Subscriber Line (DSL) service, and more particularly, to a method of managing lines associated with a DSL service so that each line can be handled through a single, centralized mechanism.

BACKGROUND OF THE INVENTION

Presently, more and more consumers are interested in having high-speed communication links in their homes. Traditionally such high-speed connections are either obtained over cable networks, satellite or Digital Subscriber Lines (DSL). One advantage to such high-speed connections is the accessibility to large bandwidth. This bandwidth can be used to send multiple communications at the same time.

In the case of DSL, the large bandwidth can be used to provide a residence with multiple communication connections or lines. DSL is a modern technology that enables broadband digital data to be transmitted over twisted copper wire. There are varieties of DSL such as Asymmetrical DSL (ADSL).

ADSL, which in turn has varieties, has three distinctive properties: (1) it supports simultaneous voice and always-on data, (2) it allows line-powered baseband voice and additional voice lines, and (3) the data bandwidth is asymmetric—up to about 9 Mbps in the downstream direction and up to e.g., about 800 Kbps in the upstream direction based upon the variant of the ADSL.

In the ADSL bandwidth, the baseband voice is carried in the 0–4 Khz frequency range. Frequencies above that range are divided into 256 4 Khz channels, with a spectrum range from about 25 Khz to a little over 1 Mhz. In the illustrative ADSL embodiment described here, the upstream data is carried in the 25 Khz to about 280 Khz range and the downstream data is carried in the 280 Khz to 1.1 Mhz range. Derived voice channels are constructed within the 25 Khz to 1.1 Mhz frequency range of the high-speed data bandwidth. When in use, each derived voice channel (i.e., line) uses 80 Kbps of the broadband bandwidth, which decreases the bandwidth available for data.

An important aspect of maintaining these multiple high-speed connections is the ability to manage all of the connections through a single interface. Users do not want to have to necessarily access a particular connection to connect to a voice communication or receive email. Furthermore, if a particular connection is busy, the user may still want to receive incoming communications on its other open connections. While many management vehicles exist in traditional PSTN and IP environments, such solutions are not readily available for DSL connections.

SUMMARY OF THE INVENTION

The present invention is directed to a method of managing communications received by a Digital Subscriber Line (DSL) terminating at a residence associated with a subscriber is disclosed. The DSL is divided into one baseband line, one or more derived lines and a data connection. A query is received from a Service Control Point (SCP) for subscriber preferences for handling an incoming communication. The query is translated into an Internet Protocol (IP) message and communicated to a web server. A Common Gateway Interface (CGI) application module is invoked that corresponds to the particular type of communication being sent to the residence. The subscriber's preferences for handling the particular type of communication are retrieved from a database. Based on the retrieved preferences and invoked CGI application, call handling instructions are sent to the SCP.

The present invention is also directed to a method of providing a click-to-dial feature to a subscriber who has highlighted a telephone number on a web site and invoked an icon displayed on the subscriber's computer to initiate a call between the subscriber and the line associated with the highlighted telephone number. A message is received at a Service Control Point (SCP) requesting a call be set up between a line associated with the subscriber and the line associated with the highlighted telephone number. A message is sent to a switch associated with a subscriber's line to activate an "off-hook immediate" trigger on the subscriber's line. A query is received from the switch for call handling instructions upon the switch's detection of an off-hook condition on the subscriber's line. The switch is directed to initiate a call from the subscriber's line to the line associated with the highlighted telephone number.

The present invention is also directed to an Internet Protocol Call Management Server (IPCMS) for managing Digital Subscriber Lines (DSLs) associated with a plurality of subscribers. Each DSL comprises a baseband line, one or more derived lines and a data line. The IPCMS comprises a Web Server for communicating with an Internet web browser on a subscriber's PC connected to a subscriber's data line, a series of Application Common Gateway Interface (CGI) modules that comprise service feature applications, and a Generic Data Interface (GDI) Gateway Server for communicating between the IPCMS and a Service Control Point (SCP).

BRIEF DESCRIPTION OF THE DRAWINGS

The present invention is illustrated by way of example and not limitation in the accompanying figures in which reference numerals indicate similar elements and in which.

DETAILED DESCRIPTION

Figure 1:
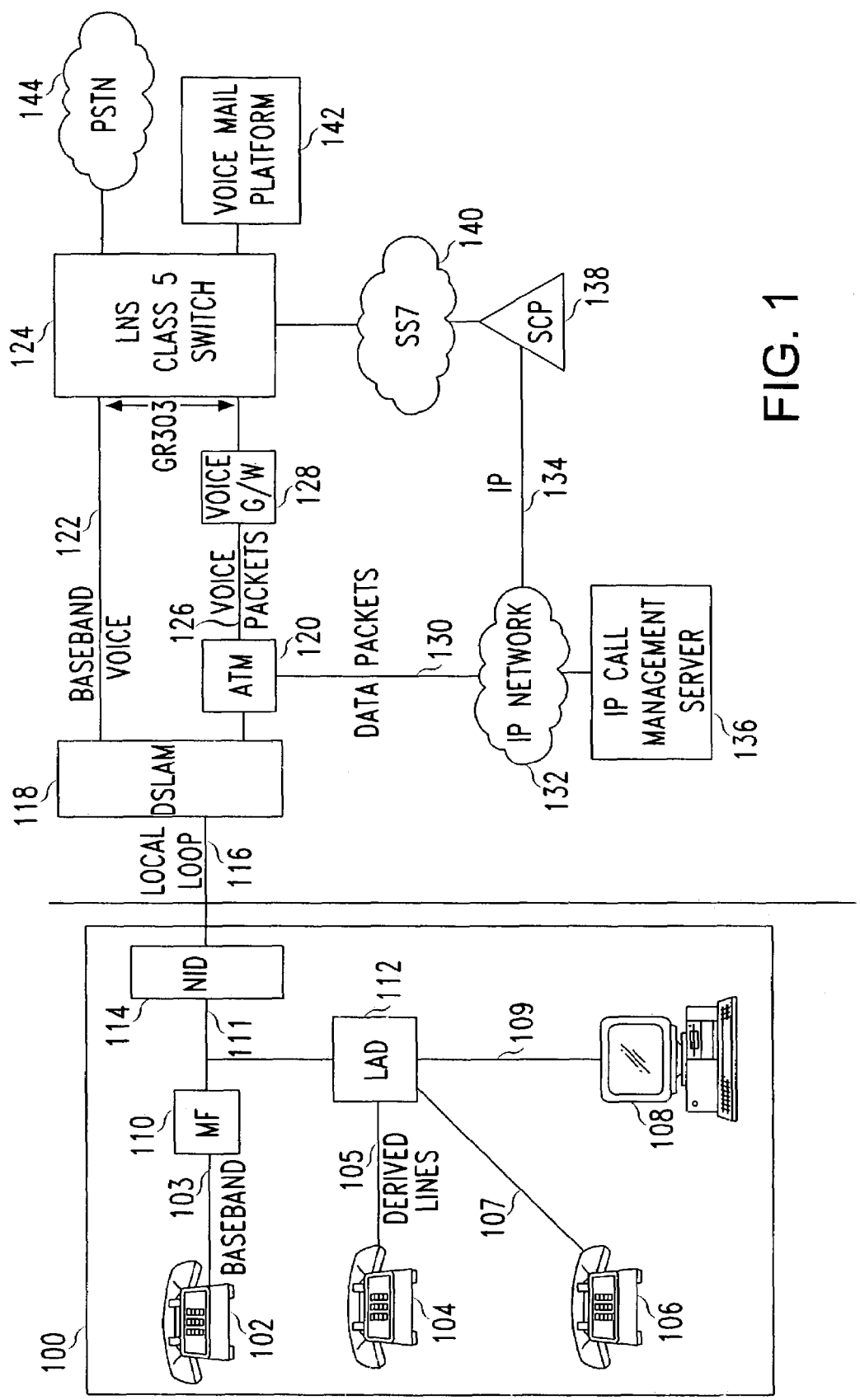
FIG. 1 is a block diagram of a network architecture that implements the present invention.

The present invention is directed to an Internet-based solution for managing multiple DSL lines associated with a particular residence or location. FIG. 1 illustrates a block diagram of a network architecture that may be used to implement the present invention. An illustrative residence 100 is equipped for Asymmetric Digital Signal Line (ADSL) service. ASDL allows more bandwidth downstream, (i.e., from the network to the residence 100) than upstream (i.e., from the residence to the network). It is to be understood by those skilled in the art that other variants of DSL may be used without departing from the scope and spirit of the present invention.

The residence 100 includes lines 103, 105, 107, and 109 connected to four communication devices 102, 104, 106, and 108. The devices illustrated are telephones 102, 104 and 106 and personal computer (PC) 108. A baseband connection 103 is established between telephone 102 and a microfilter (MF) 110. MF 110 allows the baseband frequency bandwidth to pass through to telephone 102 and filters out the higher frequency bandwidth on which the derived lines and the data communications are carried. Derived lines 105 and 107 are established between an Integrated Access Device (IAD) 112 and telephones 104 and 106, and a high-speed data connection 109 is established between the IAD 112 and PC 108.

A Network Interface Device (NID) 114 connects the home line 111 to a Digital Subscriber Line Access Multiplexer (DSLAM) 118 via a local loop 116. The local loop 116 provides the physical connection between the residence 100 and the DSLAM 118. The local loop 116 may be provided using fiber, optic, coax or microwave.

Voice communications originating from device 102 are transmitted over line 122 to a local Switch 124. Voice communications originating from devices 104 and 106 and data communications from device 108 are transmitted to an Asynchronous Transfer Mode (ATM) network 120. Voice packets originating from devices 104 and 106 are then transmitted over line 126 to voice gateway 128. Voice gateway 128 converts the voice packets to analog voice signals and transmits those signals to the local switch 124. Switch 124 provides dial tone and services for both the baseband and derived lines 103, 105 and 107. Switch 124 connects to the Public Switched Telephone Network (PSTN) 144 and a voice mail platform 142.

Figure 6:
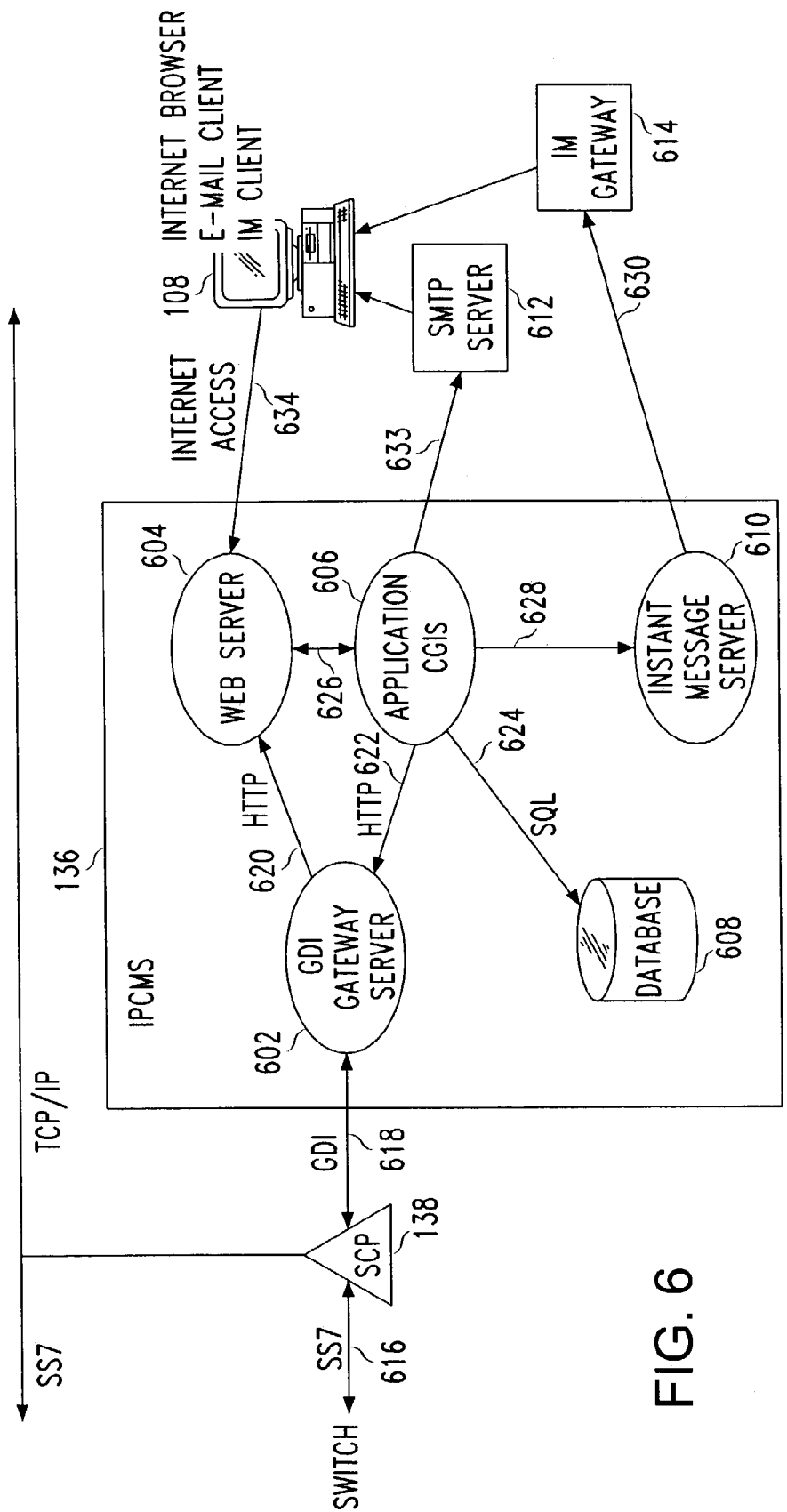
FIG. 6 is a block diagram of the IP Call Management Server (IPCMS) internal architecture and external interfaces.

Data communications originating from device 108 are communicated over line 130 to Internet Protocol (IP) network 132. An IP Call Management Server (IPCMS) 136 provides a web interface to the subscriber via the subscriber's PC 108. The IPCMS 136 also interfaces with switch 124 and Service Control Point (SCP) 138. The SCP 138 provides an IP-to-telephony interface FIG. 6 illustrates a detailed block diagram of the IPCMS 136 showing it's internal components and external interfaces. The subscriber's PC 108 (or other IP device) connects to the IPCMS 136 through the persistent high-bandwidth home access data communication line 111, or from any other IP-enabled location. The IPCMS 136 comprises modules to communicate with the subscriber's PC, to communicate with the telephony resources, and to process the subscriber features.

Specifically, the IPCMS 136 includes a Web Server 604 to communicate with an Internet web browser (not shown) on the subscriber's PC 108; a series of Application Common Gateway Interface (CGI) modules 606 that contain the service feature applications; a Generic Data Interface (GDI) Gateway Server 602 to communicate between the IPCMS 136 and the external SCP 138; and an Instant Messaging Server 610. FIG. 6, also shows the separation between telephony and IP domains. Within the telephony domain, operating on SS7 protocol 616, the switch 124 (FIG. 1) contains various known triggers (terminating call trigger, off-hook delayed trigger, off-hook immediate trigger) that cause it to pause its call processing and send queries to the SCP 138. The SCP 138 makes the integration between the SS7 telephony resources and the TCP/IP-based resources of the IPCMS 136 and the subscriber's IP device 108. GDI protocol 618 is used to communicate between the SCP 138 and the IPCMS 136.

The IPCMS 136 operates entirely with TCP/IP standards. Therefore a gateway is needed between its internal standards-based architecture and the external SCP 138. The GDI Gateway Server 602 translates GDI transactions 618 to and from the SCP 138 into http protocol. In this way the IPCMS architecture of TCP/IP standards (e.g., XML/RPC or SOAP) and the interface to the non-standard SCP provided via a gateway not only provides for the current invention but similarly this method can be applied to future uses of the IPCMS not currently described by building other gateways (e.g. to a Voice over IP (VoIP) backend) and re-using the same application software. Further aspects of FIG. 6 will be illustrated in later sections.

In accordance with the present invention, the network depicted in FIG. 1 and the server architecture depicted in FIG. 6 can be used to provide a subscriber with an Internet-based solution for managing telephone calls into and out of the residence 100. Many Advanced Call Management Services (ACMS) can be offered to the subscriber as will be described in more detail hereinafter. For example, a call-hunting feature can be provided that automatically routes incoming calls to an available non-busy line associated with the residence. A call forwarding service forwards incoming calls to any other line associated with the residence or an external line and can be administered from any phone.

An integrated voice mail service that is consolidated for all lines associated with the residence 100 includes an ability to notify the subscriber of new voice mail messages, with such notification being communicated via pager, e-mail, or message waiting indicator. An Internet-based call forwarding service allows subscribers to administer call forwarding of any of the lines associated with the residence via the web. Such administration can originate from one of the residential lines or from a remote line. The service can control the forwarding and the forward-to number based on a number of factors such as time of day, day of week and calling party identification.

An Internet-based caller information service provides real-time notification of incoming calls along with enhanced calling party information during the ring tone. The information can include pictures or maps that are obtained from a local or Internet directory. The real-time notifications are delivered to a subscriber's Internet access device. Notifications can also be received by email.

An Internet-based consolidated call log provides information on all calls to and from the residence for all lines associated with the residence. A click-to-dial feature allows the subscriber to locate a phone number anywhere on a web page, click an icon and then pick up their phone for call completion to the highlighted number. The call is placed over the PSTN. An Internet-based call screening or privacy manager provides the subscriber with a web interface for specifying how unidentified incoming calls should be handled.

Figure 2:
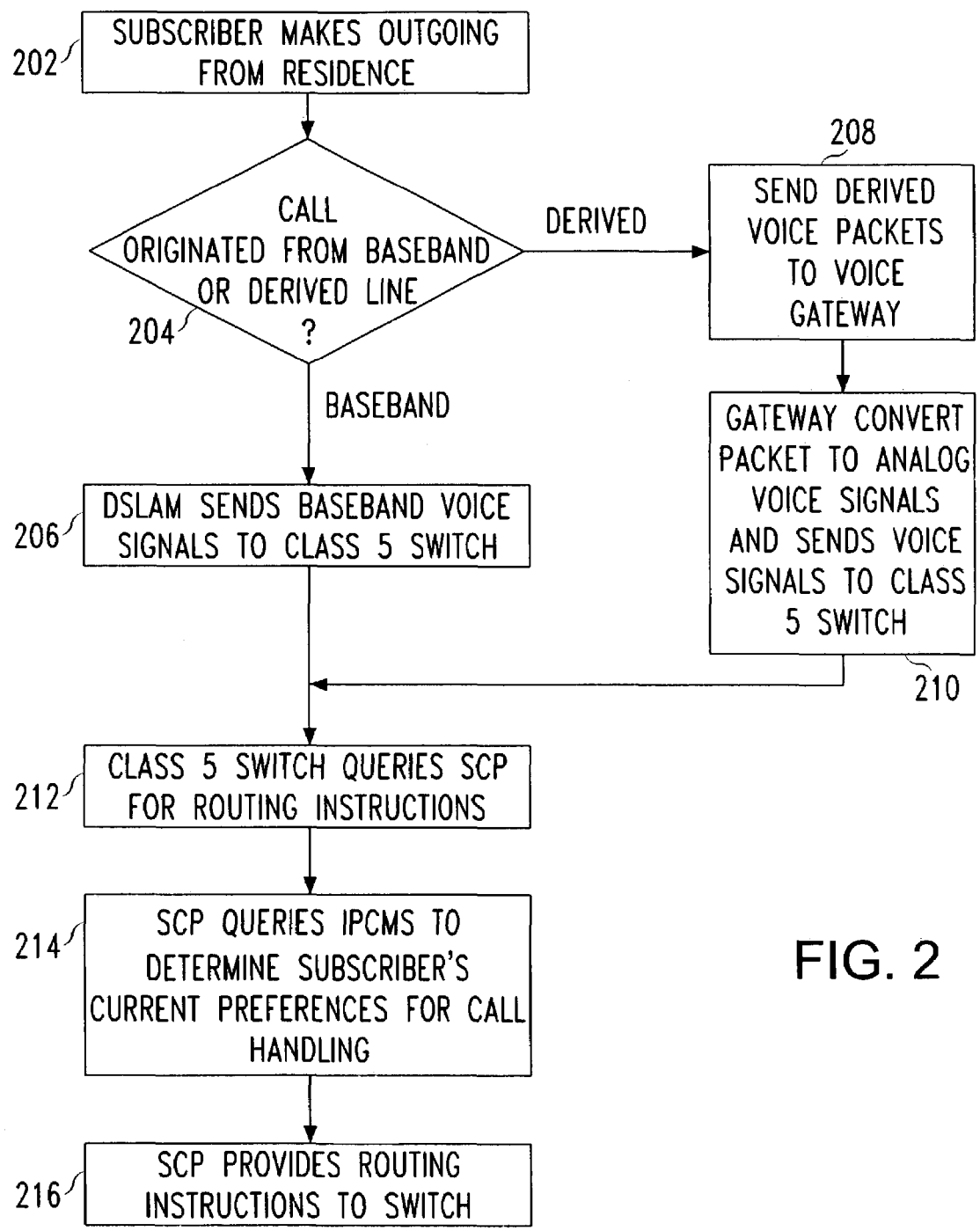
FIG. 2 is a flow chart illustrating a method for handling outgoing telephony-initiated events in accordance with the present invention.

The present invention supports both telephony-initiated and IP-initiated events. FIG. 2 is a flow chart that illustrates how an outgoing telephony-initiated event is handled in accordance with the present invention. A subscriber makes an outgoing call from one of the devices in the residence 100 (step 202). A determination is made by the DSLAM 118 as to whether the call originated from a baseband line or a derived line (step 204). If the call originated from the baseband line, the voice signals are transmitted to switch 124 (step 206). If the call originated from a derived line, the voice packets are transmitted to voice gateway 128 (step 208) which converts the voice packets into analog voice signals (step 210).

In both the case of baseband and derived line originated calls, the switch 124 queries the SCP 138 for routing instructions (step 212). The SCP 138 in turn queries the IPCMS 136 to determine the subscriber's current preferences for call handling (step 214). The SCP 138 uses these preferences to determine routing and call handling instructions for the call. Once the determination has been made, the SCP provides the switch 124 with the routing instructions and the call is routed to the dialed line (step 216).

A feature for which the above method is applicable is the logging of information about an outgoing call which will now be described will reference to elements in FIGS. 1 and 6. In the case of an outgoing call, the subscriber goes off-hook and dials a destination number. The switch's "off-hook delay" trigger on the subscriber's line is activated and the switch sends a query to the SCP 138 for call handling instructions. The query to the SCP 138 indicates an off-hook event and the SCP 138 in turn sends a query to the IPCMS 136, specifically the GDI Server 602 within the IPCMS 136, where it is translated into http and interpreted by the Web Server 604 to be an outgoing call transaction.

The Web Server 604 invokes the appropriate CGI 606, which determines from the subscriber's preferences in the database 608 that the call should be captured in the call log. The CGI 606 then records an entry in the subscriber's call log within the database 608 indicating the date and time of the call and the destination phone number. The CGI 606 then responds back to the SCP 138, via the GDI Server 602, to continue its call processing, and the SCP 138 responds to the switch to complete the call to the dialed number. Upon completion of the subscriber's outbound call, the switch 124 informs the SCP 138 that the call is complete and the SCP 138 sends a message, via the GDI Server 602, which updates the call log entry with the call's completion time. Subsequently, the subscriber can access his/her web-based call log via the PC 108 access to the IPCMS 136 and view the call details.

Figure 3:
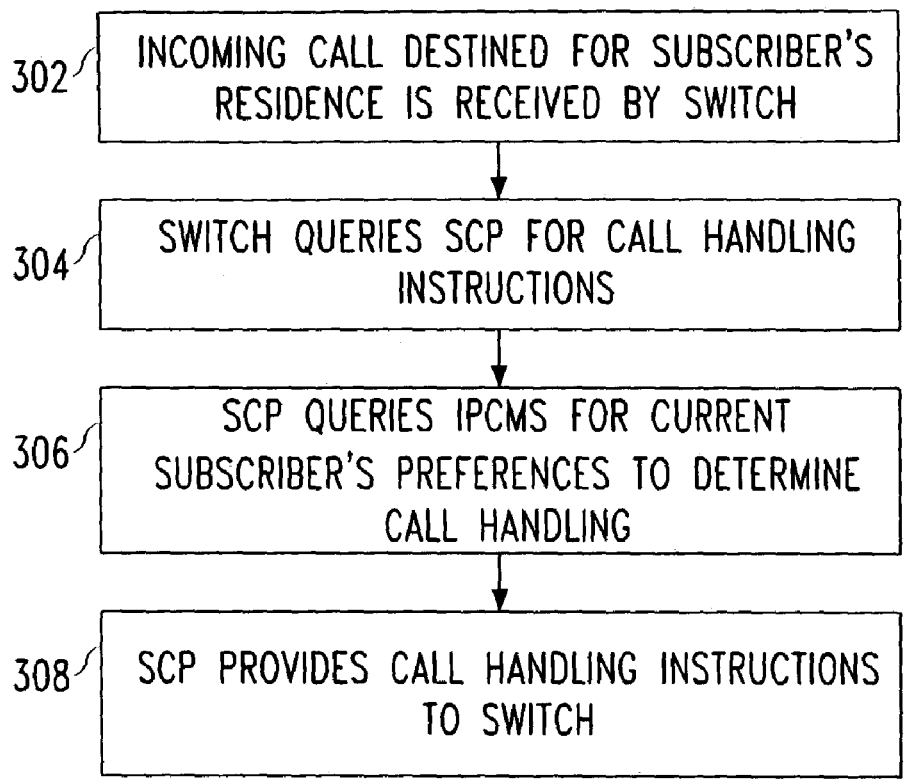
FIG. 3 is a flow chart illustrating a method for handling incoming telephony-initiated events in accordance with the present invention.

FIG. 3 is a flow chart that illustrates how incoming telephony-initiated calls are handled in accordance with the present invention. A call destined to a line associated with residence 100 is received by switch 124 (step 302). The switch 124 queries the SCP 138 for call handling instructions (step 304). The SCP queries the IPCMS 136 for the subscriber's current preferences to determine how the call should be handled (step 306). The SCP determines the call handling instructions based at least in part on the subscriber's preferences and provides the call handling instructions to the switch 124 (step 308). The switch then routes the call to the appropriate line based on the instructions.

A feature for which the above method is applicable is an Internet-based caller information service. An Internet-based caller information service provides real-time notification of incoming call along with enhanced calling party information. Such information can include maps, pictures or other images obtained from a local or Internet directory. The information is typically provided during the ringing period of the call. The real-time notification would be delivered to the subscriber's PC 108 or other device designated by the subscriber based on the location of the subscriber (i.e., the device may be a remote device if the subscriber is not at the residence 100). The notification can also be sent by e-mail.

Returning to the specific example and with reference to elements in FIGS. 1 and 6, an incoming call directed to one of the subscriber's lines is detected by switch 124, where the subscriber's "terminating call trigger" is invoked, causing the switch 124 to query the SCP 138 for call handling instructions. The SCP 138 directs the switch 124 to complete the call to the subscriber's line (e.g., line connected to device 102) and to send a message to the IPCMS 136, specifically the GDI Server 602 within the IPCMS 136. The message contains the calling party's information (e.g., calling party's number and name). The GDI Server 602 receives the message, translates it into http and it is then processed by the Web Server 604, where the associated CGI 606 is invoked. The CGI 606 retrieves from the database 608 the subscriber's preferences for calling party display.

For example, the subscriber may want additional information to be displayed. Such additional information may be obtained from a directory. The CGI 606 then invokes the Instant Messaging Server 610, where an Instant Message is created and sent to the external IM Gateway 614 associated with the subscriber's IM service, where it is pushed to the instant messaging client on the subscriber's PC 108 where it is displayed to the subscriber during the ring period of the call. The subscriber may then decide whether to answer the call or direct it to a messaging system such as voice mail or e-mail.

In addition, according to subscriber preferences in the database 608, the CGI 606 could also create an e-mail with similar information and then send it to the SMTP server 612 associated with the subscriber's e-mail service. In this approach, the e-mail is not delivered in real-time during the ring period, but the subscriber can nonetheless receive near-real-time notification of an incoming call.

Another feature for which the above method is applicable is a privacy manager feature. Through an Internet-based interface (to be described in a later section) the subscriber can establish preferences for how unidentified incoming calls should be handled, including but not limited to, accepting the call, forwarding the call to voice mail, playing a rejection message, or hanging up. In this feature, an incoming call directed to one of the subscriber's lines is detected by switch 124, which then queries the SCP 138 for call handling instructions. SCP 138 in turn queries IPCMS 136 for instructions. IPCMS 136, specifically the GDI Server 602, translates the SCP query, sends it to the Web Server 604 where the associated CGI 606 is invoked. The CGI 606 identifies the subscriber's identify from the query message and determines the preferred call handling option from the database 608 that should be applied to this call and the instructions are sent back to the SCP 138. For example, if the preferred handling of the call, based on the calling party identification, is to simply reject the call, the IPCMS 136 will send appropriate instructions to the SCP 138 who in turn will instruct the switch to drop the incoming call.

Yet another feature for which the above method is applicable is call forwarding. In this feature, the subscriber will access an Internet-based interface to establish call forwarding preferences (to be described in a later section). In this feature, an incoming call directed to one of the subscriber's lines is detected by switch 124, which then queries SCP 138 for call handling instructions. SCP 138 in turn queries IPCMS 136 for instructions. Within the IPCMS 136, the GDI Server 602 receives the query, translates it into http, and the Web Server 604 invokes the associated CGI 606. The CGI 606 determines, based on the identification of the subscriber's line and other factors to be described (such as time of day, etc.) that the incoming call should be forward to a specified number. The IPCMS 136 responds to the SCP's query with instructions that the call should be forwarded to the specified number, and the SCP 138 then responds to the switch with instruction to forward the call.

The present invention is also directed to managing IP-initiated events.

Figure 4:
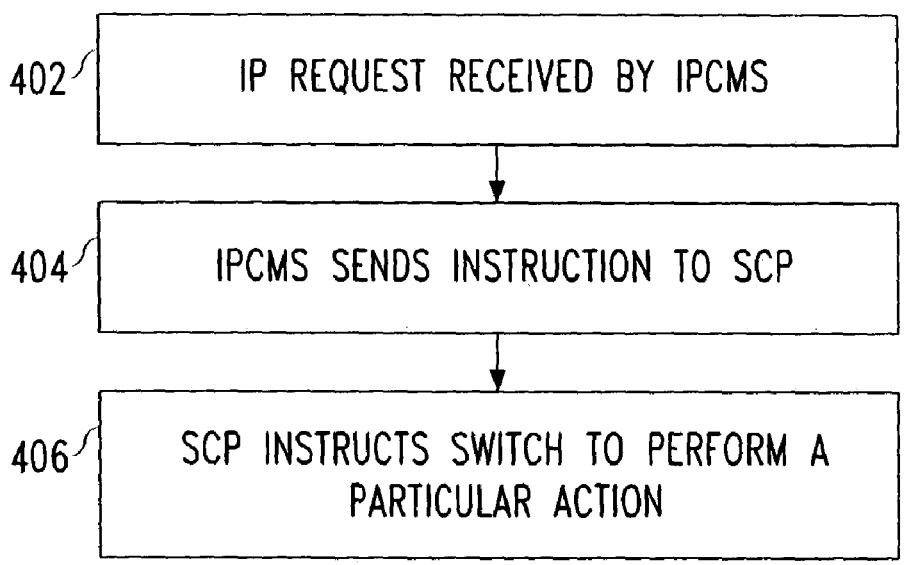
FIG. 4 is a flow chart illustrating a method for handling IP-initiated events in accordance with the present invention.

FIG. 4 is a flow chart that illustrates how IP-initiated events are handled in accordance with the present invention. An IP-initiated request is received by the IPCMS 136 (step 402). The IPCMS 136 sends instructions to the SCP 138 (step 404). The SCP 138 then instructs the switch 124 to perform one or more particular actions (step 406).

An IP-initiated event for which the method of the present invention can be used is a subscriber's use of click-to-dial feature on a web site. A subscriber can highlight a phone number on a web site and then click on a click-to-dial icon. The click on the click-to-dial icon causes the Web Server 604 (FIG. 6) to invoke the click-to-dial CGI which sends a message to the SCP 138 which contains the type of request, the subscriber's number and the click-to-dial number. The SCP 138 sends a special message to the switch 124 with instructions to arm or activate an "off-hook immediate" trigger on the subscriber's line. Concurrently, the CGI 606 sends, via the Web Server 604, a message back to the subscriber's PC 108 telling the subscriber to pick up the phone for the call to be launched. At this point the subscriber picks up their phone and the switch's "off-hook immediate" trigger, which was dynamically armed by the SCP 138, is sensed and the switch sends a query to the SCP 138 for instructions.

The SCP 138 then directs the switch 124 to initiate a call from the identified subscriber's line 111 to the specified click-to-dial number that was previously sent from the IPCMS 136. In this way, the subscriber can pick up the phone and without any further action proceed to have the call automatically completed. The call can be placed over the Plain Old Telephone Service (POTS) or by using IP telephony. The click-to-dial feature can also be integrated with the caller information service and the consolidated call log for convenient call back capability.

Figure 5A:
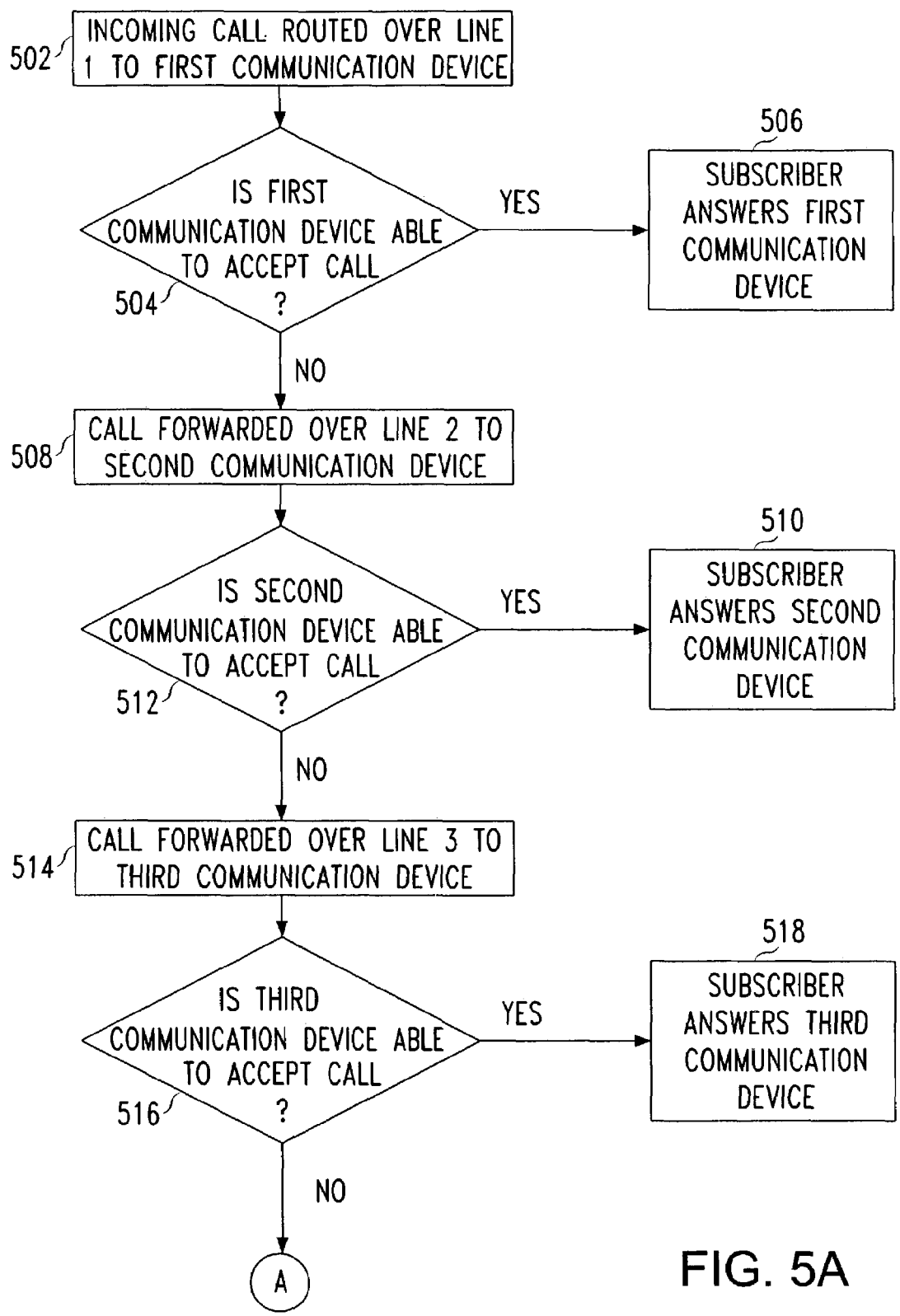
FIGS. 5A and 5B are a flow chart depicting a method for call hunting within the residence in accordance with the present invention.
Figure 5B:
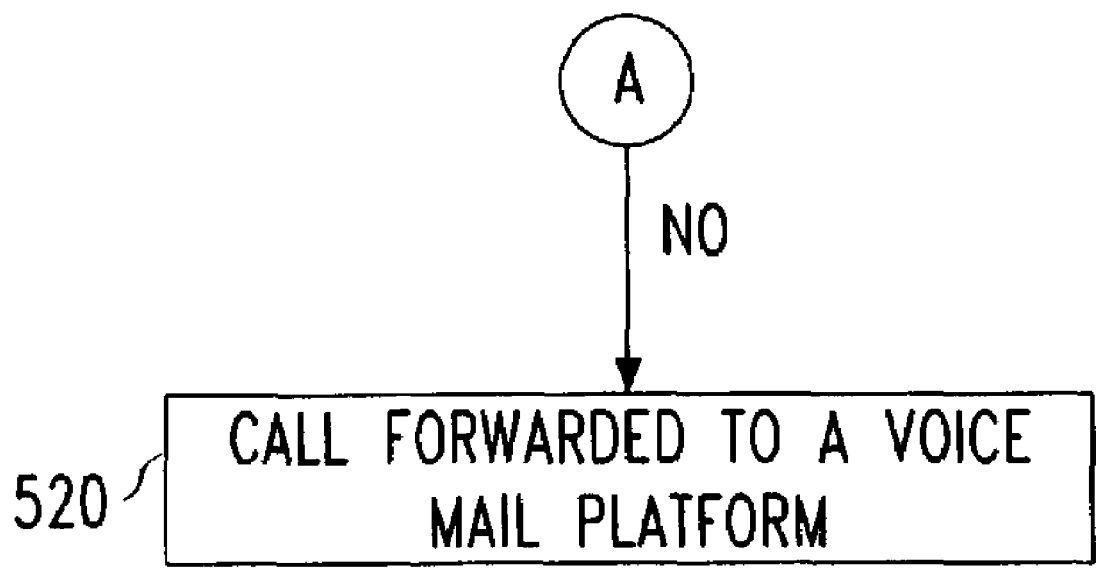

Another feature that can be provided by the present invention is call hunting within the residence 100. FIGS. 5A and 5B illustrate a flow chart that depicts the step for implementing an exemplary call hunting method. Call hunting is a feature that allows a call intended for a particular line to be routed to another available line if the intended line is busy and/or not available. The call hunting feature is activated by the IPCMS 136 based on the subscriber's call handling preferences.

An incoming call intended for line 1 (e.g., line 103) is received (step 502). A determination is made as to whether line 1 and the first communication device (e.g., telephone 102) is able to accept the call (step 504). If line 1 is available, the subscriber answers the first communication device (step 506).

If line 1 is not available, the call is routed over line 2 (e.g., line 105) to the second communication device (e.g., telephone 104) (step 508). It is to be understood by those skilled in the art that a line may not be available because the line is in use or because no one answers the line. Next, a determination is made as to whether the second communication device is able to accept the call (step 512). If line 2 is available, the subscriber can answer the second communication device (step 510).

If the line 2 is not available, the call is forwarded over line 3 (e.g., line 105) to the third communication device (e.g., telephone 106) (step 514). A determination is made as to whether the third communication device is available to accept the call (step 516). If the line 3 is available, the subscriber can answer the third communication device (step 518). If line 3 is not available, the call can be directed to a voice mail platform (step 520). It is to be understood by those skilled in the art that the call can be forwarded to the voice mail platform at any time in the call flow based on the subscriber's preferences. For example, the subscriber can request that the call be forwarded to the voice mail platform if any of the lines has a ring/no answer condition.

Another aspect of the present invention is the ability to manage calls within the residence using an Internet-based system. A web site can be accessed from which the subscriber can add, delete or update call-handling preferences. The subscriber's preferences are stored and maintained in the IPCMS 136. The web-based system can be accessed from within the residence as well as outside of the residence. This allows the subscriber to manage his DSL lines even when he or she is not home.

An example of a web-based feature that can be utilized by the subscriber is an Internet-based call-forwarding feature. The Internet-based call-forwarding feature allows the subscriber to administer call forwarding of any of the residence lines via the web. The feature can be administered from the residence or from a remote connection established by the subscriber. The subscriber accesses the IPCMS 136 from their web browser on PC 108. IPCMS 136 presents a series of options to the subscriber such that the entire set of call forwarding preferences can be captured and stored into database 608 for later reference during a real-time incoming call event. The subscriber can control the forwarding and the forward-to number by such events as time of day, day or week and calling party identification. The subscriber can select an Activate Call Forward option from a drop down menu on the web site. Likewise, to terminate the call forwarding feature, the subscriber can select a Deactivate Call Forward option from the same drop down menu.

In addition, a subscriber can schedule when a call forwarding feature is to be active. For example, the subscriber can decide how long the feature should be active (in terms of minutes, hours, days, weeks, etc.). The subscriber can also select to have the call-forwarding feature to be periodically active. For example, the feature can be active every Wednesday from 10:00 am to 2:00 pm. An alternative option is for the subscriber to be able to have selective forwarding in that only calls originated from numbers specified by the subscriber are forwarded. In addition, the subscriber may be able to forward different numbers to different forwarding numbers based on a profile established by the subscriber.

Another web-based feature available in a similar manner is an Internet-based administration of privacy manager features. These features can be administered from the residence or from a remote connection established by the subscriber. Using their web browser the subscriber access the IPCMS 136 to establish privacy manager features, which are stored in database 608, and are then used for later reference during real-time processing of an incoming call. The subscriber can use this interface to control how unidentified calls should be handled, including but not limited to, accepting the call, forwarding the call to voice mail, playing a rejection message, or hanging up. The service would also permit a caller with a pre-specified PIN to bypass the screening. Further, the subscriber could activate the screening on all calls (i.e., identified and unidentified) and thereby allow only callers the correct PIN to ring the phone.

Another Internet-based feature available to the subscriber is an IP notification of incoming calls. With this feature, an IP device can receive a pop-up notification whenever a line associated with the residence receives an incoming call. The notification can include caller ID information as well as an indication of the line on which the call was received. Notification can also be sent to an e-mail address. In some instances the caller ID function may include directory lookup capabilities that allow the subscriber to receive additional information about the caller. Directories that could be used to retrieve the additional information include web directories such as AnyWho, Yahoo Directory or MapQuest. Multimedia information, such as pictures, maps or other images can be incorporated with the caller ID information.

A subscriber can also obtain a consolidated call log over the web. The call log lists all calls originating from and to the residence. The log can be searched and sorted by a number of categories including line number, calling name, calling number and date/time. The log is also compatible with the click-to dial feature described above.

The present invention also allows enhancements to be made to a subscriber's voice mail service. A subscriber can receive e-mail notification of new voice mail messages. Information that can be included in the notification are the date/time of the message and the calling party name and number. In an alternative embodiment, the subscriber can receive the voice mail in its entirety by e-mail as an audio file attachment.

The voice-mail service can also be accessed via an Internet-based interface. When a new voice mail message is received, the subscriber can log onto the Internet-based interface and receive a listing of all voice mail messages. Included in the listing may be the date/time of the message, the recorded length of the message, and the calling party name and number. The subscriber can click on any message to have it played.

Another feature associated with the voice mail service is the capability of having a common voice mailbox for each of the lines associated with the residence. In this way voice mail can be easily accessed in one session. Alternatively, the common mailbox can be divided into sub-mailboxes which can be identified based on the line on which the call was received or the intended recipient. A subscriber can access a sub-mailbox by providing an appropriate access code.

While the present invention has been described in connection with the illustrated embodiments, it will be appreciated and understood that modifications may be made without departing from the true spirit and scope of the invention. For example, other web-based features may be added which can be used by the subscriber to manage calls to and from his residential lines such as monitoring features or other call control features. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method of providing a click-to-dial feature to a subscriber who has highlighted a telephone number on a web site and invoked an icon displayed on the subscriber's computer to initiate a call between the subscriber and the line associated with the highlighted telephone number, the method comprising the steps of:

receiving a message at a Service Control Point (SCP) requesting a call be set up between a line associated with the subscriber and the line associated with the highlighted telephone number;

sending a message to a switch associated with a subscriber's line to activate an "off-hook immediate" trigger on the subscriber's line;

receiving a query from the switch for call handling instructions upon the switch's detection of an off-hook condition on the subscriber's line;

directing the switch to initiate a call from the subscriber's line to the line associated with the highlighted telephone number;

wherein said message received by the SCP is sent by an Internet Protocol Call Management Server (IPCMS); and wherein said IPCMS sends a message to the subscriber's PC to instruct the subscriber to place the subscriber line in an off-hook condition after the switch is instructed to activate an "off-hook immediate" trigger on the subscriber's line.

* * * * *